US008867789B2

(12) United States Patent
Hsiao et al.

(10) Patent No.: US 8,867,789 B2
(45) Date of Patent: Oct. 21, 2014

(54) SYSTEMS AND METHODS FOR TRACKING AN OBJECT IN A VIDEO (71) Applicant: Cyberlink Corp., Shindian (TW)

(72) Inventors: Huan-Wen Hsiao, Chiayi (TW); Chung-Yi Weng, Taichung (TW)

(73) Assignee: Cyberlink Corp., Shindian, Taipei (TW)

( * ) Notice: Subject to any disclaimer, the term of this patent is extended or adjusted under 35 U.S.C. 154(b) by 119 days.

(21) Appl. No.: 13/740,376

(22) Filed: Jan. 14, 2013

(65) Prior Publication Data
US 2014/0198945 A1    Jul. 17, 2014

(51) Int. Cl.
G06K 9/00 (2006.01)
G06T 7/20 (2006.01)
H04N 5/228 (2006.01)

(52) U.S. Cl.
CPC .......................................... G06T 7/20 (2013.01)
USPC ......................... 382/103; 382/291; 348/208.14

(58) Field of Classification Search
USPC .......... 382/100, 103, 106–107, 162, 168, 173, 382/181, 194, 199, 209, 220, 232, 254, 274, 382/276, 291, 172, 305, 312; 348/159, 348/211.99, 208.14
See application file for complete search history.

(56) References Cited

U.S. PATENT DOCUMENTS

| 7,756,296 | B2 | 7/2010 | Porikli et al. | |
| 7,777,783 | B1 * | 8/2010 | Chin et al. | 348/211.99 |
| 7,983,448 | B1 * | 7/2011 | da Vitoria Lobo et al. | 382/103 |
| 8,300,890 | B1 * | 10/2012 | Gaikwad et al. | 382/103 |
| 2010/0316298 | A1 * | 12/2010 | Swaminathan et al. | 382/209 |
| 2012/0274777 | A1 * | 11/2012 | Saptharishi et al. | 348/159 |

FOREIGN PATENT DOCUMENTS

| CN | 101287142 A | 10/2008 |
| EP | 0942395 A2 | 9/1999 |

OTHER PUBLICATIONS

Kim et al. "Semiautomatic Segmentation Using Spatio-Temporal Gradual Region Merging for MPEG-4" IEICE Trans. Fundamentals, vol. E86-A, No. 10, Oct. 2003.*
Agarwala et al. "Keyframe-based Tracking for Rotoscoping and Animation" ACM SIGGRAPH conference proceedings, 2004.
Cherif et al. "A Tracking Framework for Accurate Face Localization" Department of Informatics, Aristotle University of Thessaloniki.

* cited by examiner

Primary Examiner — Seyed Azarian
(74) Attorney, Agent, or Firm — McClure, Qualey & Rodack, LLP (57) ABSTRACT Disclosed are various embodiments for tracking an object shown as moving in a video. One embodiment is a method for tracking an object in a video that comprises tracking in a first temporal direction an object in a plurality of video frames and generating a first tracking result, evaluating the first tracking result corresponding to tracking of the object in the first temporal direction, and stopping tracking in the first temporal direction upon the occurrence of a predefined event, wherein the predefined event is based on an evaluated tracking result. The method further comprises obtaining data identifying an object outline of the object upon stopping the tracking in the first temporal direction, tracking in a second temporal direction the object based on the data identifying the object outline of the object to generate a second tracking result, and generating a refined tracking result based on at least on one of the first tracking result, the second tracking result, or a combination thereof.

26 Claims, 9 Drawing Sheets

SYSTEMS AND METHODS FOR TRACKING AN OBJECT IN A VIDEO

BACKGROUND

An object that moves through a series of video frames in a video may be tracked for various purposes. However, tracking the object as it appears in each video frame may be slow and imprecise. As such, there exists a desire to facilitate the tracking of an object in a video.

SUMMARY

Briefly described, one embodiment, among others, is a method for tracking an object in a video. The method comprises tracking in a first temporal direction an object in a plurality of video frames and generating a first tracking result, evaluating the first tracking result corresponding to tracking of the object in the first temporal direction, and stopping tracking in the first temporal direction upon the occurrence of a predefined event, wherein the predefined event is based on an evaluated tracking result. The method further comprises obtaining data identifying an object outline of the object upon stopping the tracking in the first temporal direction, tracking in a second temporal direction the object based on the data identifying the object outline of the object to generate a second tracking result, and generating a refined tracking result based on at least on one of the first tracking result, the second tracking result, or a combination thereof.

Another embodiments is a system for tracking an object in a video. The system comprises at least one computing device and an application executable in the at least one computing device. The application comprises logic that determines an initial outline of the object in a plurality of video frames in the video; logic that tracks the object in the video in a first temporal direction to generate a first tracking result; and logic that stops tracking of the object in the first temporal direction based on an evaluation of the tracking of the object in the first temporal direction. The application further comprises logic that obtains data from a user identifying an outline of the object upon the occurrence of a predefined event; logic that tracks the object in the video in a second temporal direction based on the data from the user; and logic that generates a tracking result based on a combination of a result from the logic that tracks the object in the first temporal direction and a result from the logic that tracks the object in the second temporal direction.

Another embodiment is a non-transitory computer-readable medium embodying a program executable in a computing device, comprising code that obtains a plurality of video frames of a video comprising an object; code that obtains data from a user identifying an initial outline of the object in one of the video frames; code that tracks the object across a plurality of the video frames in a first temporal direction to generate a first tracking result; and code that determines a tracking confidence level of the first tracking result for a plurality of the video frames, the tracking confidence level being based on a plurality of probability values for a plurality of pixels.

In accordance with such embodiments, the program further comprises code that stops the code that tracks the object in the first temporal direction upon an occurrence of a first predefined event, the first predefined event being based on a changing rate of tracking confidence levels of successive frames; code that obtains data identifying an outline of the object upon the tracking of the object in the first temporal direction being stopped, the data being obtained from a user; code that tracks the object across a plurality of video frames in a second temporal direction to generate a second tracking result, the second temporal direction being an opposite direction of the first temporal direction; and code that generates a refined tracking result based on at least a portion of the first tracking result from the code that tracks the object in the first temporal direction and at least a portion of the second tracking result from the code that tracks the object in the second temporal direction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure is directed towards facilitating the tracking of an object shown in a video. As a non-limiting example, the object is tracked in a forward temporal direction. Upon the occurrence of a predefined event, the tracking in the forward temporal direction is stopped. Thereafter, the object is tracked in a reverse temporal direction. The results from the tracking in the forward temporal direction and the tracking in the reverse temporal direction are then combined in order to form a tracking result. In the following discussion, a general description of the system and its components is provided, followed by a discussion of the operation of the same.

Figure 1:
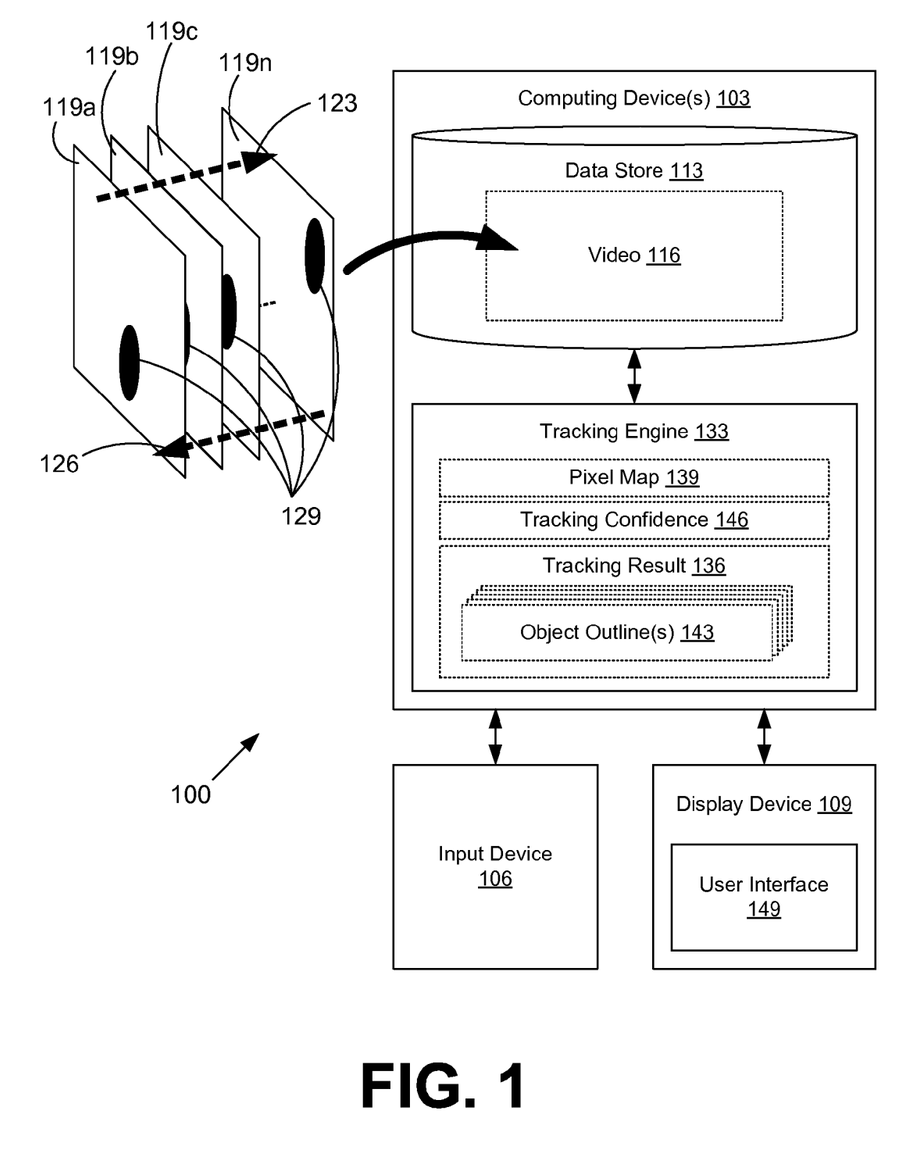
FIG. 1 is a drawing of computing environment according to various embodiments of the present disclosure.

With reference to FIG. 1, shown is a computing environment 100 according to various embodiments. The computing environment 100 includes a computing device 103, an input device 106, a display device 109, and possibly other components. It is emphasized that the arrangement of the computing environment 100 shown in FIG. 1 is merely one example among other arrangements in accordance with the present disclosure.

The computing device 103 may comprise, for example, a processor-based system such as a computer system. Such a computer system may be embodied in the form of a desktop computer, a laptop computer, a personal digital assistant, a cellular telephone, a web pad, a tablet computer system, a game console, a server device, or any other device with like capability.

In various embodiments, the functionality of the present disclosure may be distributed across multiple computing devices 103. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in various arrangements.

Various applications and/or other functionality may be executed in the computing device 103 according to various embodiments. Also, various data is stored in a data store 113 that is accessible to the computing device 103. The data store 113 may be representative of a plurality of data stores, as may be appreciated.

The data stored in the data store 113 includes video 116 and potentially other data. The video 116 may have been obtained, for example, from an imaging device (not shown) and then stored in the data store 113. In alternative embodiments, the video 116 may be generated by the computing device 103 or another device. As may be appreciated, each video frame 119a-119n has several pixels (not shown). Each pixel may include a value representing a color level, intensity level, and/or other type of information. By rendering the pixel data for a sequence of the video frames 119a-119n, a moving scene may be presented.

The video 116 may be configured to be played and/or processed in a first temporal direction 123 and a second temporal direction 126, which is in an opposite temporal direction from the first temporal direction 123. Thus, for example, video 116 playback and/or processing in the first temporal direction 123 may be in the forward direction, while playback and/or processing in the second temporal direction 126 may be in the reverse direction.

An object 129 may be depicted in one or more video frames 119a-119n. An object 129 may be, for example, a physical item shown in a scene that has been recorded by an imaging device. In various alternative embodiments, the object 129 may be generated by a computing device 103 or another device. Thus, as non-limiting examples, an object 129 may be a person, animal, vehicle, structure, etc. The object 129 may be shown as moving in at least a portion of the video 116.

The components executed on the computing device 103 include, for example, a tracking engine 133 and possibly other applications, services, processes, systems, engines, and/or functionality not discussed in detail herein. The tracking engine 133 may be executed to track an outline of an object 129 and its movement through more than one video frame 119a-119n in order to generate a tracking result 136. To this end, the tracking engine 133 may determine a pixel map 139, a tracking confidence 146, a tracking result 136 comprising one or more object outlines 143, and possibly other information for each of the video frames 119a-119n.

A pixel map 139 may be generated for at least a portion of an object 129 or a video frame 119a-119n. A pixel map 139 may be, for example a mapping of values to the pixels of the video frames 119a-119n. The values may represent colors, intensities, or other information associated with the object 129 or video frames 119a-119n. For example, a pixel map may be represented by a color model corresponding to the object 129. In various embodiments, the values in the pixel map 139 may be used to determine the object outline 143 and/or tracking confidences 146 for each of the video frames 119a-119n, as will be discussed later.

The object outline 143 may indicate the position of the object 129 within a particular video frame 119a-119n. For example, the object outline 143 may be represented as a border, contour, or a region of the object 129. As will be discussed later, the object outline 143 may be input by a user and/or determined by the tracking engine 133. A group of object outline 143 represents a tracking result.

The tracking confidence 146 may indicate a level at which it is believed that the object 129 is being tracked accurately. The tracking confidence 146 may be calculated by the tracking engine 133, or, in alternative embodiments, the tracking confidence 146 may be obtained from a user using the input device 106, for example.

The tracking result 136 is a group of object outline 143 and it may represent the movement of the object 129 that was determined by the tracking engine 133. In various embodiments, the tracking result 136 may be a spatial and/or temporal combination of at least a portion of a result from tracking the object 129 in the first temporal direction 123 with at least a portion of a result from tracking the object 129 in the second temporal direction 126.

The input device 106 may facilitate the entry and manipulation of data and the computing device 103 by a user, as may be appreciated. In various embodiments, the input device 106 may be embodied in the form of a mouse, keyboard, touchpad, track pad, touch screen, or any other type of device with like capability. As will be discussed later, the input device 106 may be used by a user to manually input an object outline 143 or to perform other activities.

The display device 109 may present visual displays of information associated with the computing device 103. To this end, the display device 109 may comprise, for example, one or more liquid crystal display (LCD) screens, light emitting diode (LED) screens, gas plasma-based panel displays, LCD projectors, cathode ray tubes (CRTs), or other devices of like capability. Additionally, the display device 109 may render a user interface 149 generated by the computing device 103. The user interface 149 may present visual representations of the video 116 or other information and facilitate interaction with and control of the computing device 103.

Next, a general description of the operation of the various components of the computing environment 100 is provided. To begin, it is assumed that video 116 data has been stored in the data store 113 and that the tracking engine 133 has been executed and is running.

The tracking engine 133 may obtain the first one of the video frames 119a-119n (hereinafter referred to as video frame 119a), and render the video frame 119a in the user interface 149 of the display device 109. With the video frame 119a being rendered, the user interface 149 may prompt the user to provide the initial object outline 143 of the object 129 to be tracked. The user may provide the initial object outline 143 by tracing around the boundary of the object, for example, by using the input device 106.

With the initial object outline 143 being identified, the tracking engine 133 may begin the process of tracking the object 129 in the first temporal direction 123. To this end, the tracking engine 133 may determine the pixel map 139 for at least a portion of the object 129 or first video frame 119a. As previously mentioned, the pixel map 139 may be a mapping of values to pixels of the video frame 119a, wherein the values indicate a color, intensity, or other type of level. The pixel map 139 and/or other information associated with the object 129 may be used to determine the object outline 143 throughout other frames 119b-119n, as will now be discussed.

With the pixel map 139 for the object 129 and/or the first video frame 119a determined, the tracking engine 133 may obtain the next one of the video frames 119a-119n in the first temporal direction 123 (hereinafter referred to as video frame 119b). The tracking engine 133 may then determine the pixel map 139 for the video frame 119b.

By using the pixel map 139 for the current video frame 119b and the pixel map 139 for one of the previous video frames (for example, 119a), the tracking engine 133 may determine whether the pixels in the current video frame 119b correspond to the object 129. To this end, the tracking engine 133 may analyze each pixel and assign a probability value to the pixel indicating the extent to which it is believed that the pixel forms part of the object (foreground region) 129 or a background region in the current video frame 119b. The probability values may be based on, for example, an estimated motion vector, a color distribution, an intensity gradient, and/or any other information or algorithm for tracking the object 129.

With the probability values for the pixels in the video frame 119b determined, the tracking engine 133 may determine which of the pixels correspond to the object 129. To this end, the tracking engine 133 may select the pixels having probability values that are within a predefined threshold as being those that correspond to the object 129. Other methods for determining the pixels that correspond to the object 129 may be used as well.

The tracking engine 133 may also determine the tracking confidence 146 for the current video frame 119b. In various embodiments, the tracking confidence 146 may be the average probability value for all or a portion of the pixels in the object 129, for example. As an alternative, the tracking confidence 146 may be based on a weighted average of multiple probability values for multiple pixels of the object 129. Furthermore, in some embodiments, the tracking confidence 146 may be calculated based on a motion vector between two consecutive video frames 119a-119n. As an additional example, the tracking confidence 146 may be based on a color distribution similarity of the object 129 between multiple video frames 119a-119b.

For some embodiments, the tracking process may be implemented according to a cost minimization model where the outline of the tracked object is determined according to the optimal minimum cost. In the example above, the tracking confidence 146 may be determined based on the determined minimum cost. Furthermore, in some embodiments, the tracking confidence 146 may be set based on an image quality estimation of the tracked video frame. For example, the tracking confidence 146 may be set to a lower value if the tracked video frame is determined to have a high level of noise, significant image blurring, low image intensity, or if the image contains high-coding-artifacts. In other embodiments, the tracking confidence 146 may be set to a lower value if the tracked video frame has a high motion value or if the size of the tracked object varies significantly. Furthermore, if the tracked object is occluded by other objects, the tracking confidence 146 may be set to a lower value. Note that other methods for determining the tracking confidence 146 for the video frame 119b may also be used as well.

The next one of the video frames 119a-119n in the first temporal direction 123 (hereinafter referred to as video frame 119c) may be obtained, and the process described above may be repeated. The process of tracking the object 129 in the first temporal direction 123 may be repeated until the occurrence of a predefined event. For instance, the predefined event may be based on an evaluation of the tracking of the object 129 in the first temporal direction 123. As a non-limiting example, the event may be one of the video frames 119a-119n having a tracking confidence 146 that meets or falls below a predefined threshold. In various other embodiments, the event may be the occurrence of a predefined number of consecutive video frames 119a-119n having a tracking confidence 146 that meets or falls below a predefined threshold. In another embodiment, the predefined event is based on a changing rate of tracking confidence associated with successive frames where a changing rate is determined based on a difference sequence of tracking confidence.

In general, the difference (if any) of the two tracking confidence values across three consecutive video frames should not vary by a large amount. In this regard, a predefined event may be associated with instances when the difference of the two tracking confidence values changes dramatically. For example, consider a sequence of consecutive frames (f1, f2, . . . fn−1) where the corresponding absolute difference values in the tracking confidence levels are represented by (d1, d2, . . . do−2). For some embodiments, the average of the absolute difference value of the tracking confidence level (denoted herein as M) is calculated as (d1+d2+dn−2)/(n−2). If the difference in the tracking confidence levels between frames (fn−1) and (fn) is, for example, twice as low as the average M, then for some embodiments, this constitutes a predefined event.

For some embodiments, the predefined event may also comprise a command from a user to stop the tracking process in the first temporal direction 123. Such a command may be given, for example, by a user selecting a button provided by the user interface 149. Upon the tracking in the first temporal direction 123 being stopped, the tracking engine 133 may prompt a user to provide the object outline 143. For example, the user interface 149 may provide a message box prompting the user to trace around a boundary of the object 129 being tracked by using the input device 106.

Various methods may be used for the user to identify the object outline 143. For example, the user interface 149 may show at least a portion of the tracking result 136 and/or the object outline 143 from the most recently processed one of the video frames 119a-119n, and the user may trace around a boundary in order to correct the object outline 143 when a predefined event occurs to produce a refined tracking result 136. In even further alternative embodiments, the previous tracking result 136 and/or object outline 143 may not be shown, and the user may trace around the entire object 129 being tracked. It is emphasized that identifying the object outline 143 may be performed using other techniques as well.

Upon the object outline 143 being input by the user and received by the computing device 103, the tracking engine 133 may begin tracking the object 129 in the second temporal direction 126 based on the data identifying the object outline 143. Thus, in the case in which the first temporal direction 123 was forward in time, the tracking engine 133 may track the object 129 in the direction that is reverse in time. In order to track the object 129 in the second temporal direction 126, the same methods described above with respect to tracking in the first temporal direction 123 may be used. Other tracking methods may be used as well.

The tracking in the second temporal direction 126 may be performed until the occurrence of another predefined event. For example, the tracking in the second temporal direction 126 may be stopped upon reaching the first video frame 119a that was processed when tracking in the first temporal direction 123. In various alternative embodiments, the predefined event may be a stop command being received from a user. In various alternative embodiments, the predefined event further comprises the occurrence of a scene change.

Additionally, in various embodiments, the predefined event that stops the tracking in the second temporal direction 126 may be based on an amount of overlap between a first tracking result from tracking in the first temporal direction 123 and a second tracking result from tracking in the second temporal direction 126. To this end, the tracking engine 133 may determine an amount of overlap between the result from the tracking in the first temporal direction 123 and the result from the tracking in the second temporal direction 126 for each of the relevant video frames 119a-119n. Upon the overlap reaching a predefined threshold, for example, the tracking in the second temporal direction 126 may be stopped. It is emphasized that the occurrence of other predefined events may be used to stop the tracking in the second temporal direction 126 as well.

The tracking engine 133 may generate the refined tracking result 136 based on the results from the tracking in the first temporal direction 123 and the tracking in the second temporal direction 126. For example, a portion of the results from the tracking in the first temporal direction 123 and a portion of the results from the tracking in the second temporal direction 126 may be combined. Thus, in various embodiments, the tracking engine 133 may determine an amount of overlap between the result of the tracking in the first temporal direction 123 and the result of tracking in the second temporal direction 126 for the relevant video frames 119a-119n. The tracking engine 133 may then select one of the video frames 119a-119n based on its amount of overlap. For example, the one of the video frames 119a-119n having the greatest amount of overlap or an overlap amount exceeding a threshold may be selected. Thereafter, for each of the video frames 119a-119n previous to the selected video frame 119a-119n in the first temporal direction 123, the result from the tracking in the first temporal direction 123 may be used for a portion of the refined tracking result 136. For each of the video frames 119a-119n subsequent to the selected video frame 119a-119n in the first temporal direction 123, the result from the tracking in second temporal direction 126 may be used for a portion of the refined tracking result 136.

Even further, in various alternative embodiments, the tracking engine 133 may analyze each relevant one of the video frames 119a-119n and select either a result from the tracking in the first temporal direction 123 or a result from the tracking in the second temporal direction 126 as forming the tracking result for the corresponding one of the video frames 119a-119n. The tracking engine 133 may select the result that has the highest tracking confidence 146, for example.

In any case, upon determining the tracking result 136, the information may be saved in the data store 113 and/or used for various purposes. For example, the tracking result 136 may be provided to a video processing engine in order to facilitate a batch editing operation for the object 129.

Referring next to FIGS. 2A-2H, shown is an example of a sequence of the user interface 149 being rendered in the display device 109 (FIG. 1) according to various embodiments of the present disclosure. It is emphasized that the example shown is merely one example among many in accordance with the present disclosure.

Figure 2A:
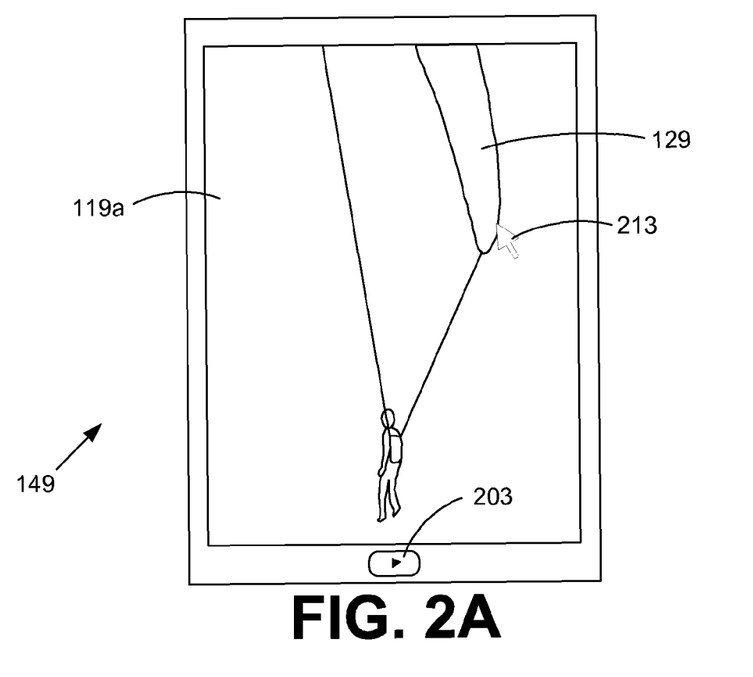
FIGS. 2A-2H are drawings of examples of a user interface rendered by a display device in the computing environment of FIG. 1 according to various embodiments of the present disclosure.

Beginning with FIG. 2A, the user interface 149 shown may be rendered upon it being determined that an object 129 is to be tracked in the first temporal direction 123 (FIG. 1). The user interface 149 includes a rendering of a first one of the video frames 119a-119n (hereinafter referred to as video frame 119a), a control button 203, a cursor 213, and possibly other components not discussed in detail herein. In the present example user interface 149, the object 129 to be tracked is a parachute.

The control button 203 may initiate (and later stop) the tracking in the first temporal direction 123 (FIG. 1), for example. The cursor 213 may facilitate the inputting of data that indicates the object outline 143a (FIG. 1). In this sense, the user may, for example, use the cursor 213 to trace around an outline of the object 129. Other ways of indicating the object outline 143a may be used as well.

Figure 2B:
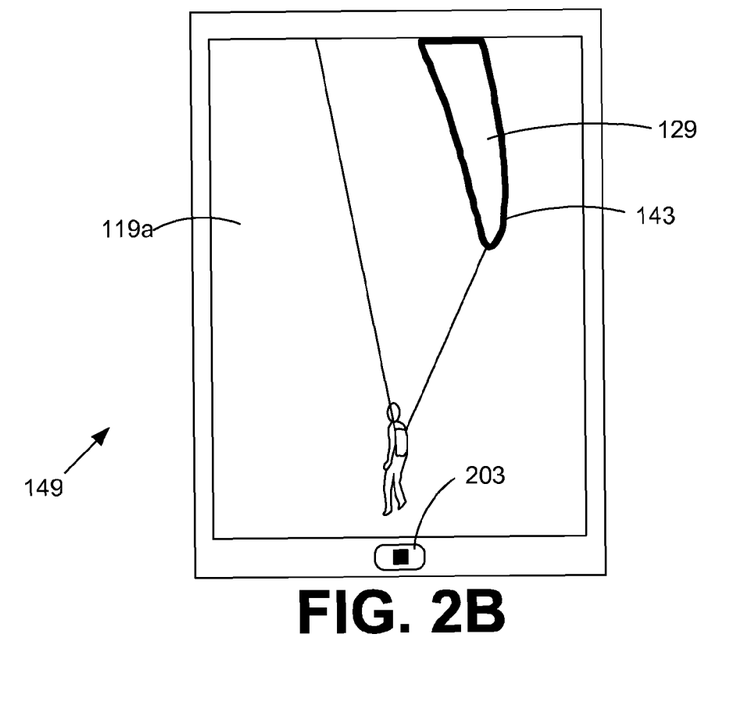

Turning now to FIG. 2B, shown is an example of the user interface 149 after the object outline 143b has been identified and the process of tracking the object 129 in the first temporal direction 123 (FIG. 1) has been initiated. As shown, the user interface 149 includes a rendering of the video frame 119a, the control button 203, the object 129, the object outline 143b, and possibly other components not discussed in detail herein.

By providing the visual representation of the object outline 143b determined by the tracking engine 133 (FIG. 1), a user may be able to monitor the progress of the tracking in the first temporal direction 123. The user may view the progress of the object outline 143b to decide whether the tracking is being performed in a satisfactory manner. By selecting the control button 203 (now in the form of a stop button), the user may stop the tracking in the first temporal direction 123, for example, if the tracking is not being performed in a satisfactory manner.

Figure 2C:
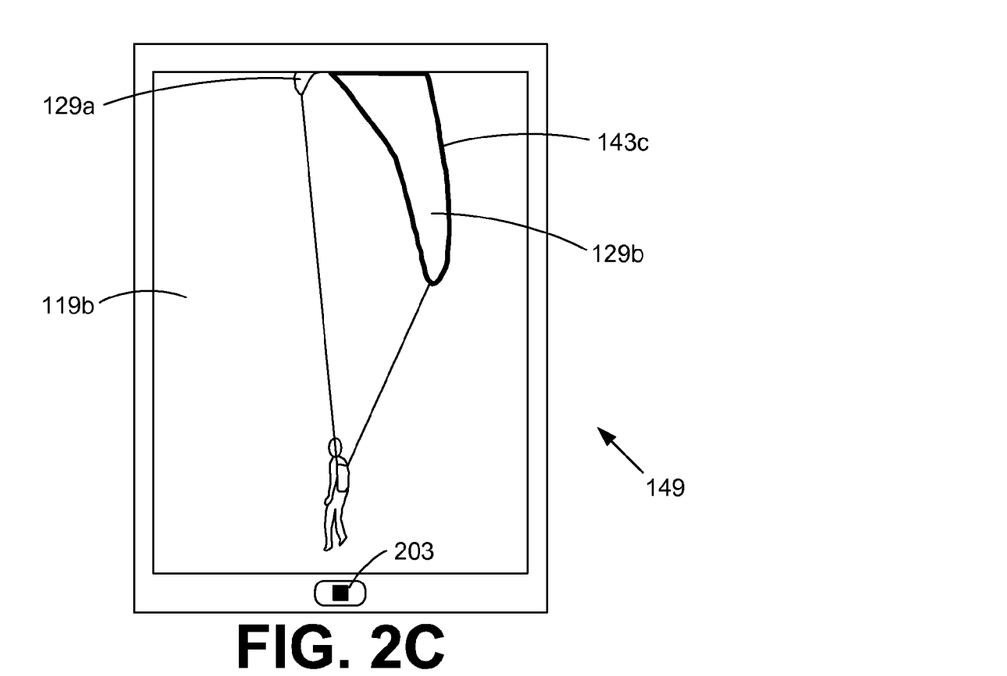

Moving on to FIG. 2C, shown is an example of the user interface 149 as the tracking in the first temporal direction 123 (FIG. 1) has progressed to the next one of the video frames 119a-119n (hereinafter referred to as video frame 119b). As shown, the user interface 149 includes a rendering of the video frame 119b, the control button 203, the object outline 143c, and possibly other components not discussed in detail herein.

Because a portion of the object 129 (hereinafter referred to as object portion 129a) that was previously outside of the video frame 119a (FIG. 2B) is now within the frame, the object portion 129b is not being tracked as part of the object outline 143c. However, the other portion of the object 129 (hereinafter referred to as objection portion 129b) that was visible in the video frame 119b is being tracked.

Figure 2D:
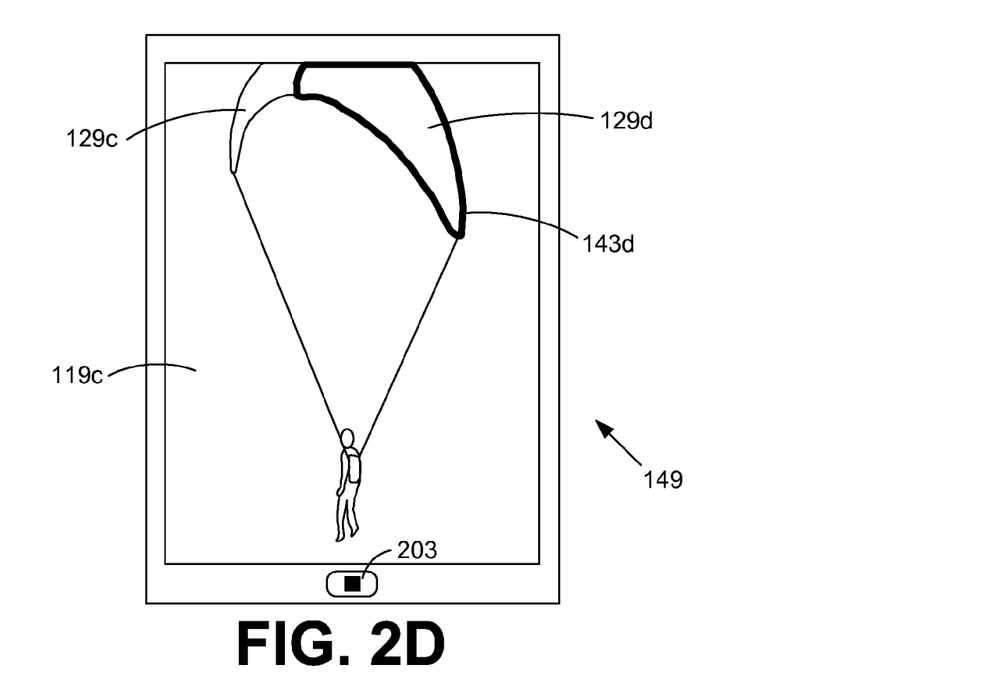

Moving now to FIG. 2D, shown is an example of the user interface 149 as the tracking in the first temporal direction 123 (FIG. 1) has progressed to the next one of the video frames 119a-119n (hereinafter referred to as video frame 119c). The user interface 149 includes a rendering of the video frame 119c, the control button 203, the object outline 143d, and possibly other components not discussed in detail herein.

As shown, the object portion 129a that was previously outside of the video frames 119a-119b (FIGS. 2A-2B) has now extended farther into the video frame 119c and changes its shape into object portion 129c. As such, the tracking engine 133 (FIG. 1) has only identified the region 129d defined by the object outline 143d shown as corresponding to the object outline 143 (FIG. 1). At this point, the tracking confidence 146 (FIG. 1) for the video frame 119c is decreasing as compared to video frames 119a-119b.

Figure 2E:
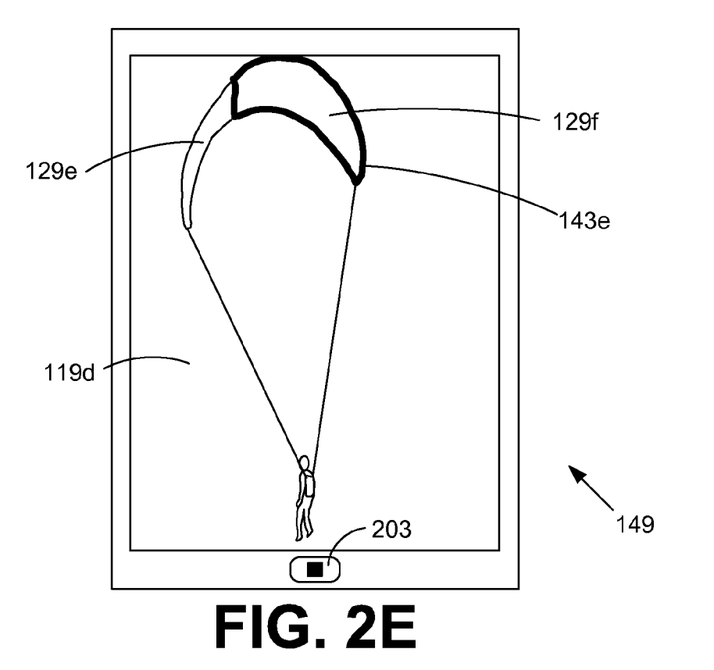

Turning now to FIG. 2E, shown is an example of the user interface 149 as the tracking in the first temporal direction 123 (FIG. 1) has progressed to the next one of the video frames 119a-119n (hereinafter referred to as video frame 119d). As shown, the user interface 149 includes a rendering of the video frame 119d, the control button 203, the object outline 143e, and possibly other components not discussed in detail herein.

The object portion 129c that was previously outside of the video frames 119a-119c is now entirely within the video frame 119d and the object portion changes its shape to portion 129e. However, the tracking engine 133 has not identified the object portion 129e as being a part of the object outline 143e. Only portion 129f is a part of the object outline 143e. In the example shown, the tracking confidence 146 (FIG. 1) is now even less than the tracking confidence 146 of the previous video frames 119a-119c.

Figure 2F:
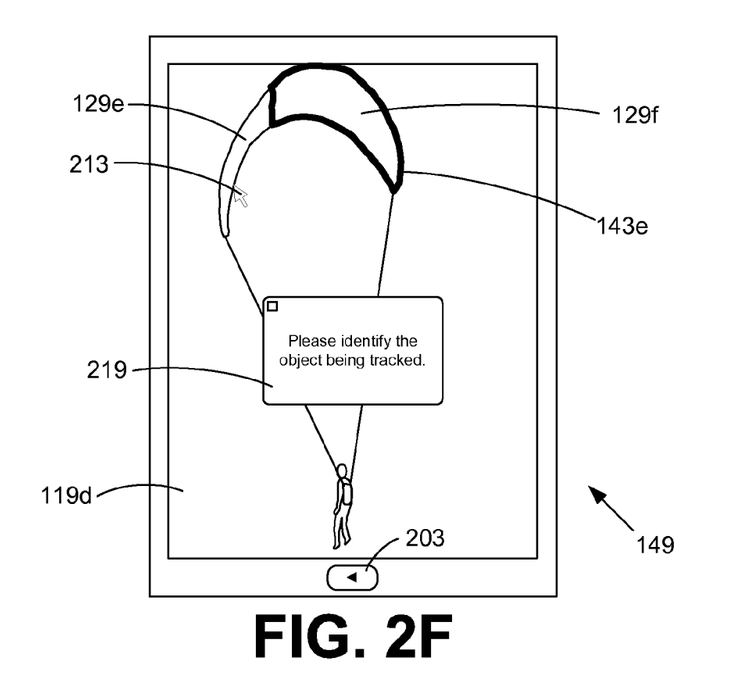

Referring now to FIG. 2F, shown is an example of the user interface 149 rendered upon the tracking in the first temporal direction 123 (FIG. 1) being stopped due to the occurrence of a predefined event. The predefined event may be, for example, a predefined number of video frames 119a-119n having a tracking confidence 146 (FIG. 1) that falls below a predefined threshold. In an alternative embodiment, the predefined event is based on a changing rate of tracking confidence of successive frames. A changing rate corresponds to a difference in values between at least two tracking confidence levels. In various alternative embodiments, the event may be the user commanding the stop by selecting the control button 203 shown in FIGS. 2A-2E, for example.

The user interface 149 now includes a rendering of the video frame 119d, the object outline 143, the control button 203, the cursor 213, a text box 219, and possibly other components not discussed in detail herein. The text box 219 may provide a prompt for the user to identify the object outline 143 (FIG. 1). In the example shown, the user may use the cursor 213 to trace around the object portion 129a, thereby causing the object outline 143 to encompass both object portions 129e-129f in FIG. 2E. In alternative embodiments, the user may trace around both object portions 129e-129f in FIG. 2E, for example. Upon the object outline 143 (FIG. 1) being provided and/or edited by the user, the user may select the control button 203, thereby initiating the tracking in the second temporal direction 126 (FIG. 1).

Figure 2G:
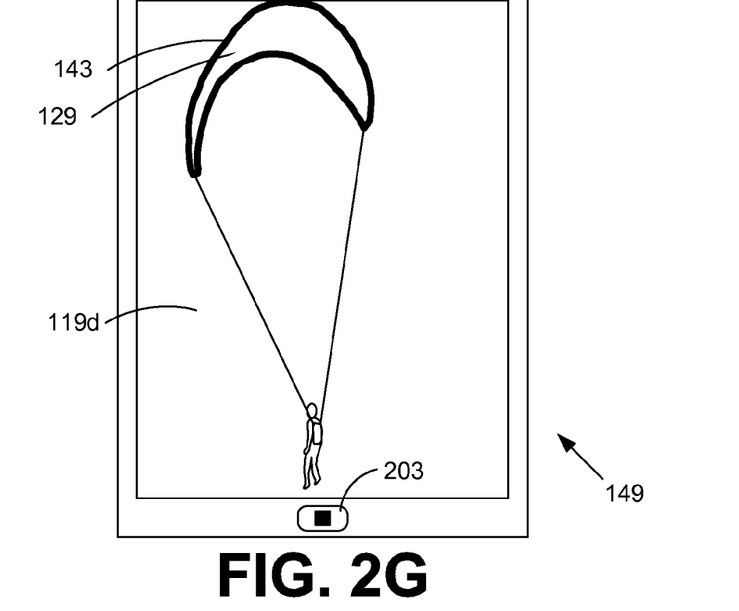

Turning to FIG. 2G, shown is an example of the user interface 149 upon the tracking in the second temporal direction 126 (FIG. 1) being initiated. The user interface 149 now includes a rendering of the video frame 119d, the control button 203, the object outline 143, and possibly other components not discussed in detail herein.

As shown in FIG. 2G, the object outline 143 now includes the entire boundary of what was previously object portions 129e-129f (FIG. 2F). Thus, the object outline 143 now encompasses the entire object 129.

Figure 2H:
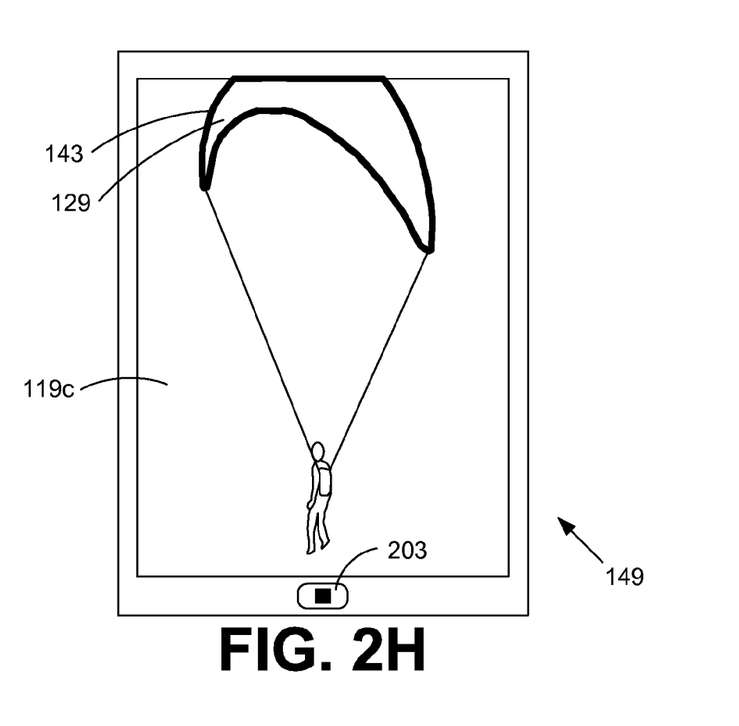

Moving now to FIG. 2H, shown is an example of the user interface 149 as the tracking in the second temporal direction 126 (FIG. 1) has progressed to the next video frame 119c. In other words, the tracking is now progressing in a reverse direction in the present example. The user interface 149 includes a rendering of the video frame 119c, the object outline 143, the control button 203, and possibly other components not discussed in detail herein.

Similar to as in FIG. 2G, the object outline 143 now includes the entire boundary of what was previously object portions 129e-129f (FIG. 2F). Thus, the object outline 143 now encompasses the object 129. The tracking engine 133 (FIG. 1) may continue to track the object 129 in the second temporal direction 126 until the occurrence of a predefined event. For example, the predefined event may be reaching the first video frame 119a that was used in tracking in the first temporal direction 123 (FIG. 1). In alternative embodiments, the predefined event may be selecting the control button 203, for example.

Figure 3A:
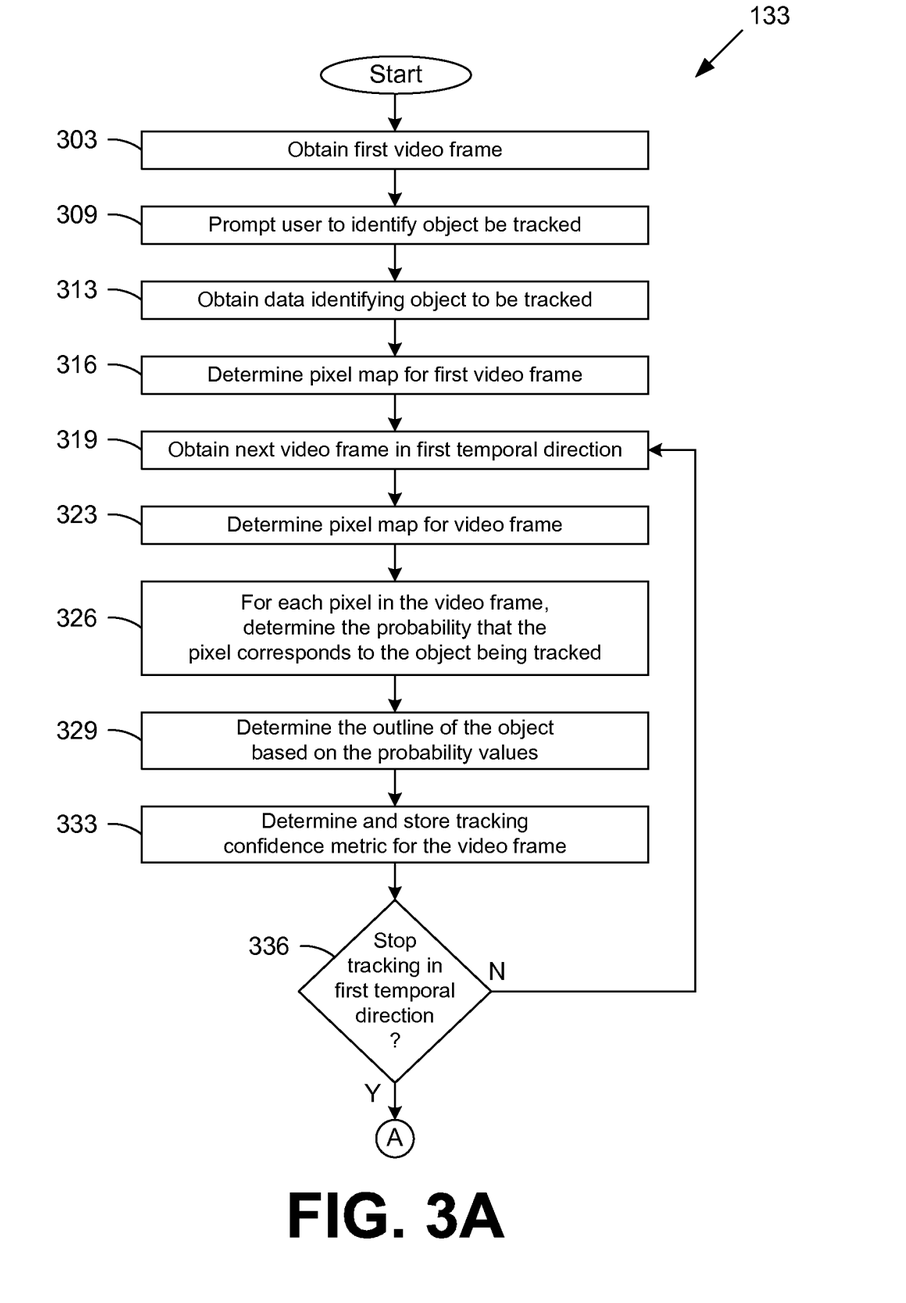
FIGS. 3A-3B is a flowchart illustrating one example of functionality implemented as portions of a tracking engine executed in a computing device in the computing environment of FIG. 1 according to various embodiments of the present disclosure.
Figure 3B:
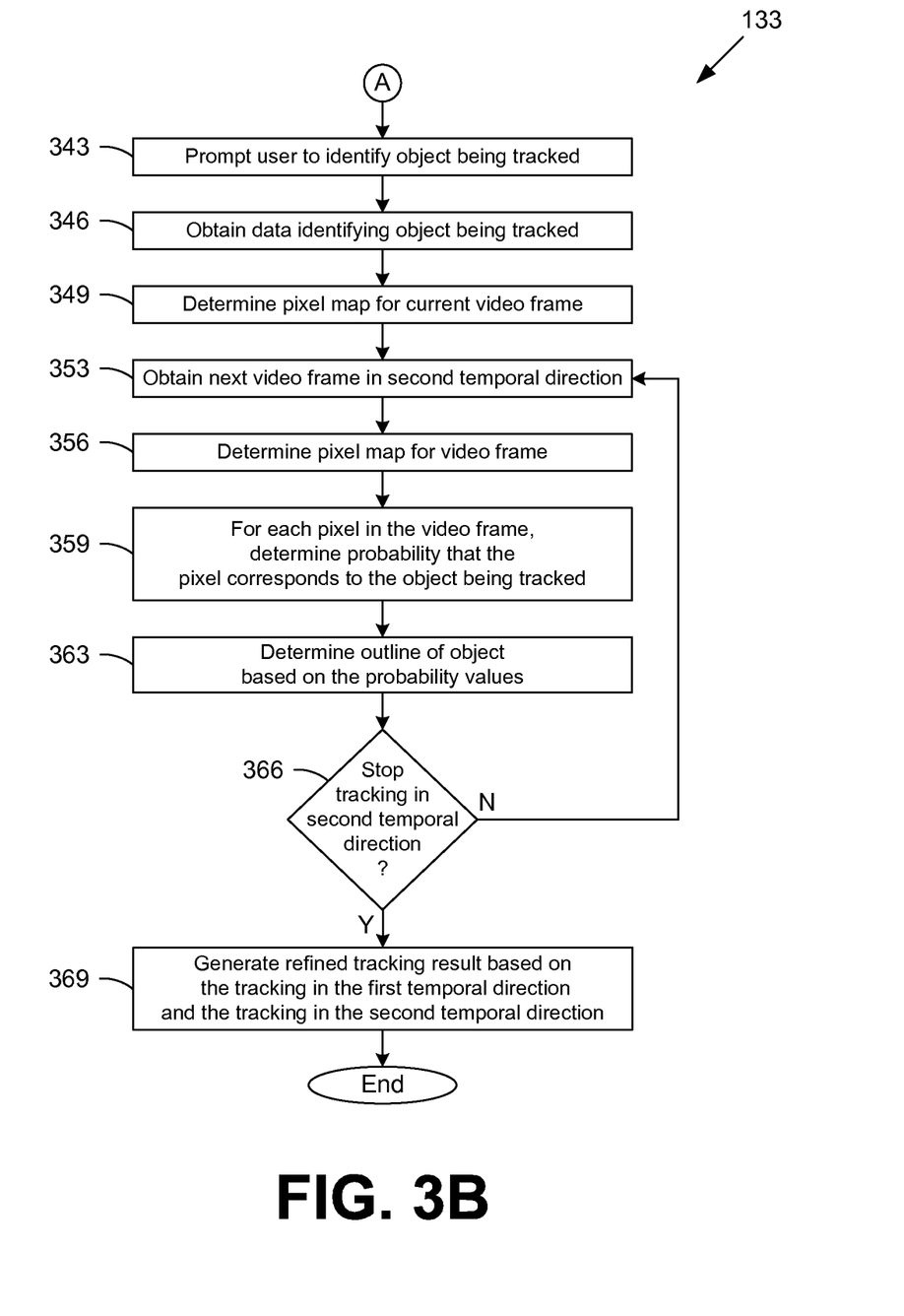

Referring next to FIGS. 3A-3B, shown is a flowchart that provides one example of the operation of a portion of the tracking engine 133 according to various embodiments. It is understood that the flowchart of FIGS. 3A-3B provides merely an example of the many different types of functional arrangements that may be employed to implement the operation of the portion of the tracking engine 133 as described herein. As an alternative, the flowchart of FIGS. 3A-3B may be viewed as depicting an example of steps of a method implemented in the computing device 103 (FIG. 1) according to one or more embodiments.

Beginning with reference 303, the tracking engine 133 obtains the first one of the video frames 119a-119n (FIG. 1). Next, the user is then prompted to identify the object 129 (FIG. 1) to be tracked, as depicted in reference 309. This may be accomplished, for example, by the user tracing around the object 129 to provide the object outline 143. Upon the user providing the data, the data identifying the object 129 to be tracked is obtained by the tracking engine 133, as shown in reference 313, and the tracking engine 133 may begin the process of tracking the object 129 in the first temporal direction 123 (FIG. 1).

The tracking engine 133 then moves to reference 316 and determines a pixel map (for example, a first color model) for the first one of the video frames 119a-119n. Thereafter, the next one of the video frames 119a-119n in the first temporal direction 123 is obtained, as shown in reference 319. The tracking engine 133 then moves to reference 323 and determines the pixel map (for example, a second color model) for that video frame 119a-119n. For each pixel in the video frame 119a-119n, by comparing the first and the second color models, the probability that the pixel corresponds to the object 129 being tracked is determined, as shown in reference 326.

Moving to reference 329, the object outline 143 (FIG. 1) in the video frame 119a-119n is determined based on the probability values. Additionally, the tracking engine 133 may determine and store the tracking confidence 146 for the video frame 119a-119n, as shown in reference 333.

Next, as depicted in reference 336, it is determined whether the tracking engine 133 is to stop tracking in the first temporal direction 123. If not, the tracking engine 133 returns to reference 319 and the process is repeated as shown until the tracking engine 133 determines that it is to stop tracking in the first temporal direction 123.

The tracking engine 133 then moves to reference 339 and prompts the user to identify the object 129 being tracked, as shown in reference 343. Thereafter, as depicted in reference 346, the data identifying the object 129 being tracked is obtained, and the tracking engine 133 may being the process of tracking the object 129 in the second temporal direction 126.

Moving to reference 349, the pixel map for the current one of the video frames 119a-119n is determined. The next video frame 119a-119n in the second temporal direction 126 is then obtained, as shown in reference 353, and its pixel map is determined, as depicted in reference 356. For each pixel in the video frame 119a-119n, the probability that the pixel corresponds to the object 129 being tracked is determined, as shown in reference 359. The tracking engine 133 then determines the object outline 143 based on the probability values of the pixels, as depicted in reference 363.

The tracking engine 133 then moves to reference 366 and determines whether to stop tracking the object 129 in the second temporal direct 126. It may determine to stop tracking upon the occurrence of a predefined event, for example. If the tracking engine 133 determines to stop tracking in the second temporal direction 126, the tracking engine 133 returns to reference 353, and the process is repeated is shown.

Upon determining that the tracking in the second temporal direction 126 is to be stopped, the tracking engine 133 moves to reference 369 and generates the tracking result 136 (FIG. 1) based on the result for the tracking in the first temporal direction 123 and the result for the tracking in the second temporal direction 126. Thereafter, the process ends.

Figure 5A:
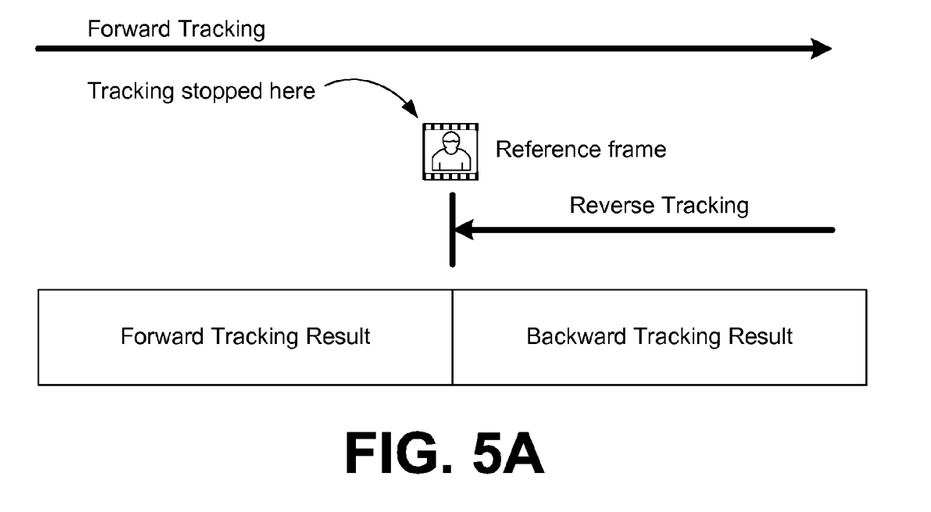
FIGS. 5A and 5B illustrate embodiments of the tracking process performed by the tracking engine according to various embodiments of the present disclosure.
Figure 5B:
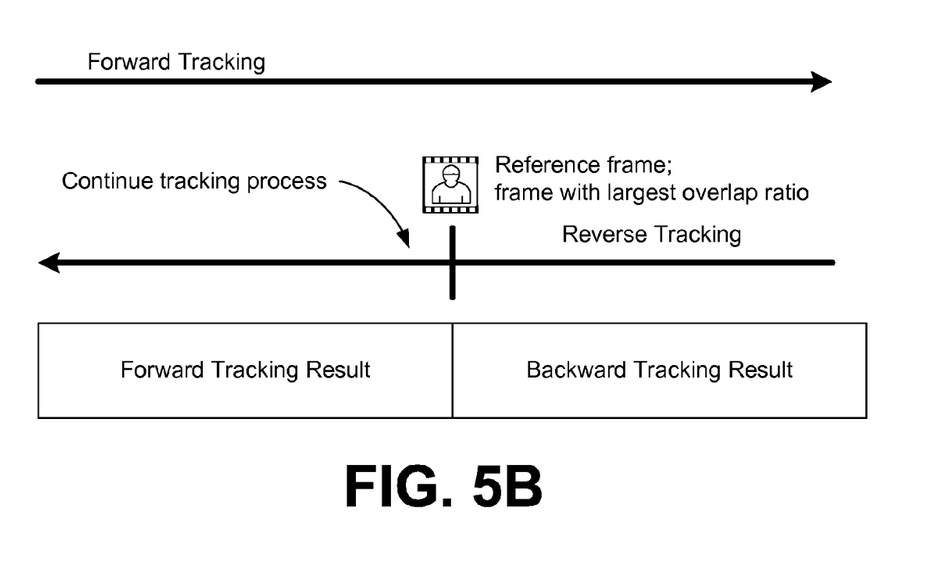

Reference is made to FIGS. 5A and 5B, which illustrate embodiments of the tracking process performed by the tracking engine according to various embodiments of the present disclosure. As described above, tracking is performed in both the forward direction and in the backward direction and where tracking results in both directions are determined. The forward tracking result is evaluated, and tracking is stopped upon the occurrence of a predefined event. A refined tracking result is generated based on the forward tracking result and the backward tracking result.

With reference to FIG. 5A, for some embodiments, the tracking process further comprises determining, for each tracked frame in the backward tracking process, an overlap ratio of tracked object outlines corresponding to the forward tracking and the backward tracking for the same frame. The overlap ratio represents the degree in which the forward tracking result aligns with the backward tracking result. Tracking is stopped in the backward tracking direction based on the overlap ratio. The current frame in which backward tracking is stopped is selected as a reference frame. Then, for each of the video frames preceding the reference frame in the forward direction, at least a portion of a result is selected from the forward tracking result in the forward tracking direction as being a portion of the refined tracking result. For each of the video frames following the reference frame in the forward tracking direction, at least a portion of a result from the backward tracking result in the backward tracking direction is selected as being a portion of the refined tracking result.

For some embodiments, tracking comprises determining, for each tracked frame in the backward tracking, an overlap ratio of tracked object outlines corresponding to the forward tracking and the backward tracking for the same frame. As illustrated in FIG. 5A, tracking of the object is stopped in the backward temporal direction, where tracking is stopped is based on the overlap ratio. The video frame in which tracking is stopped is selected as a reference frame. Then, for each of the video frames following the reference frame in the forward temporal direction, at least a portion of a result from the forward tracking result in the forward temporal direction is selected as being a portion of the refined tracking result. For each of the video frames preceding the reference frame in the forward temporal direction, at least a portion of a result from the backward tracking result in the backward temporal direction is selected as being a portion of the refined tracking result.

Reference is made to FIG. 5B, which illustrates the tracking process in accordance with another embodiments. For such embodiments, tracking further comprises determining, for each tracked frame in the backward tracking direction, an overlap ratio of tracked object outlines corresponding to the forward tracking and the backward tracking for the same frame. The video frame having the largest overlap ratio is selected as the reference frame. Then, for each of the video frames preceding the reference frame in the forward tracking direction, at least a portion of a result from the forward tracking result in the forward tracking direction is selected as being a portion of the refined tracking result. For each of the video frames following the reference frame in the forward tracking direction, at least a portion of a result from the backward tracking result in the backward tracking direction is selected as being a portion of the refined tracking result.

For some embodiments, tracking comprises determining, for each tracked frame in the backward tracking direction, an overlap ratio of tracked object outlines corresponding to the forward tracking and the backward tracking for the same frame. The video frame having the largest overlap ratio is selected as a reference frame. Then, for each of the video frames following the reference frame in the forward temporal direction, at least a portion of a result from the forward tracking result in the forward temporal direction is selected as being a portion of the refined tracking result. For each of the video frames preceding the reference frame in the forward temporal direction, at least a portion of a result from the backward tracking result in the backward temporal direction is selected as being a portion of the refined tracking result.

Figure 4:
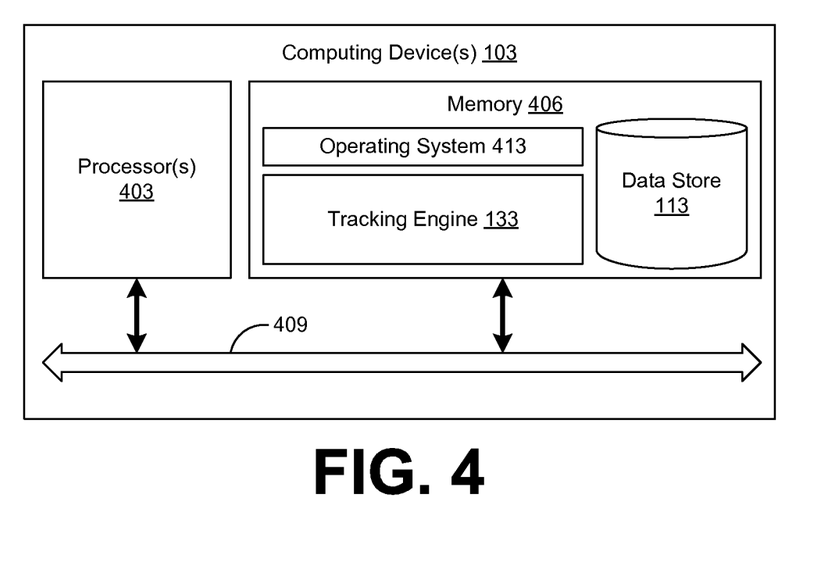
FIG. 4 is a schematic block diagram that provides one example illustration of a computing device employed in the computing environment of FIG. 1 according to various embodiments of the present disclosure.

With reference to FIG. 4, shown is a schematic block diagram of the computing device 103 according to various embodiments of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 is the tracking engine 133 and potentially other applications. Also stored in the memory 406 may be the data store 113 and other data. In addition, an operating system 413 may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors and the memory 406 may represent multiple memories that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the tracking engine 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIGS. 3A-3B shows the functionality and operation of an implementation of portions of the tracking engine 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIGS. 3A-3B shows a specific order of execution, it is understood that the order of execution may differ from that which is depicted. For example, the order of execution of two or more blocks may be varied relative to the order shown. Also, two or more blocks shown in succession in FIGS. 3A-3B may be executed concurrently or with partial concurrence. Further, in some embodiments, one or more of the blocks shown in FIGS. 3A-3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the tracking engine 133, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It is be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, comprising:
    code that obtains a plurality of video frames of a video comprising an object;
    code that obtains data from a user identifying an initial outline of the object in one of the video frames;
    code that tracks the object across a plurality of the video frames in a first temporal direction to generate a first tracking result;
    code that determines a tracking confidence level of the first tracking result for a plurality of the video frames, the tracking confidence level being based on a plurality of probability values for a plurality of pixels;
    code that stops the code that tracks the object in the first temporal direction upon an occurrence of a first predefined event, the first predefined event being based on a changing rate of tracking confidence levels of successive frames;
    code that obtains data identifying an outline of the object upon the tracking of the object in the first temporal direction being stopped, the data being obtained from a user;
    code that tracks the object across a plurality of video frames in a second temporal direction to generate a second tracking result, the second temporal direction being an opposite direction of the first temporal direction; and code that generates a refined tracking result based on at least a portion of the first tracking result from the code that tracks the object in the first temporal direction and at least a portion of the second tracking result from the code that tracks the object in the second temporal direction;

wherein the code that tracks the object in the first temporal direction and the code that tracks the object in the second temporal direction are based on an estimated motion vector of at least one pixel, a color distribution for the object, an intensity gradient for the object, or a combination thereof.

2. The computer-readable medium of claim 1, wherein the tracking confidence level is calculated based on a weighted average of the plurality of probability values for a plurality of the pixels.

3. The computer-readable medium of claim 1, further comprising code that stops the code that tracks the object in the second temporal direction upon an occurrence of a second predefined event.

4. A system for tracking an object in a video, comprising:
at least one computing device; and
an application executable in the at least one computing device, the application comprising:
logic that determines an initial outline of the object in a plurality of video frames in the video;
logic that tracks the object in the video in a first temporal direction to generate a first tracking result;
logic that stops tracking of the object in the first temporal direction based on an evaluation of the tracking of the object in the first temporal direction;
logic that obtains data from a user identifying an outline of the object upon the occurrence of a predefined event;
logic that tracks the object in the video in a second temporal direction based on the data from the user; and
logic that generates a tracking result based on a combination of a result from the logic that tracks the object in the first temporal direction and a result from the logic that tracks the object in the second temporal direction;
wherein the logic that tracks the object in the first temporal direction and the logic that tracks the object in the second temporal direction perform tracking based on an estimated motion vector of at least one pixel, a color distribution for the object, an intensity gradient for the object, or any combination thereof.

5. The system of claim 4, wherein the predefined event comprises the occurrence of at least one of the video frames having a tracking confidence level below a predefined threshold.

6. The system of claim 4, wherein the predefined event comprises the occurrence of a predefined quantity of consecutive video frames having a tracking confidence level below a predefined threshold.

7. The system of claim 4, wherein the logic that generates the tracking result further comprises logic that selects at least a portion of a result from the logic that tracks the object in the first temporal direction or at least a portion of a result from the logic that tracks the object in the second temporal direction for each of the video frames as being at least a portion of the tracking result.

8. A method for tracking an object in a video, comprising:
tracking in a first temporal direction an object in a plurality of video frames and generating a first tracking result;

evaluating the first tracking result corresponding to tracking of the object in the first temporal direction;
stopping tracking in the first temporal direction upon the occurrence of a predefined event, wherein the predefined event is based on an evaluated tracking result;
obtaining data identifying an object outline of the object upon stopping the tracking in the first temporal direction;
tracking in a second temporal direction the object based on the data identifying the object outline of the object to generate a second tracking result; and
generating a refined tracking result based on at least on one of the first tracking result, the second tracking result, or a combination thereof;
wherein the tracking confidence level is calculated based on a motion vector between two consecutive video frames.

9. The method of claim 8, wherein evaluating the first tracking result further comprises:
calculating a plurality of probability values for a plurality of pixels for the at least one of the video frames, the probability values indicating a probability that the pixels correspond to the object; and
calculating a tracking confidence level for the at least one of the video frames, the tracking confidence level being based on the probability values.

10. The method of claim 9, wherein the tracking confidence level is calculated based on a weighted average of a plurality of the probability values of a plurality of the pixels.

11. The method of claim 9, wherein the probability value is calculated based on a similarity of a color distribution of the object in at least two frames of the tracking result.

12. The method of claim 8, wherein evaluating the first tracking result is based on a scene change detection result.

13. The method of claim 8, wherein the predefined event comprises the occurrence of at least one of the video frames having a tracking confidence level below a predefined threshold.

14. The method of claim 8, wherein the predefined event comprises the occurrence of a changing rate of tracking confidence level of successive frames.

15. The method of claim 8, wherein the tracking in the first temporal direction and the tracking in the second temporal direction are based on an estimated motion vector of at least one pixel, a color distribution for the object, an intensity gradient for the object, or any combination thereof.

16. The method of claim 8, wherein generating the refined tracking result further comprises combining at least a portion of a result from the first tracking result in the first temporal direction with at least a portion of a result from second tracking result in the second temporal direction for a plurality of the video frames.

17. The method of claim 8, wherein combining further comprises:
determining a video frame, wherein the video frame in the first tracking corresponds to the same video frame in the second tracking, and wherein each tracking result comprises a tracked object outline; and
merging the tracked object outlines of the determined video frame according to the first tracking and the second tracking to generate the refined tracking result.

18. The method of claim 8, wherein merging is based on the tracking confidence levels of the video frame in the first tracking and the second tracking.

19. The method of claim 8, wherein each tracking result comprises a tracked object outline, and wherein the method further comprises:

for each tracked frame in the second tracking, determining an overlap ratio of tracked object outlines corresponding to the first tracking and the second tracking for the same frame;
stopping tracking of the object in the second temporal direction, wherein stopping is based on the overlap ratio; and
upon stopping tracking in the second temporal direction, selecting a current video frame in which stopping occurs as a reference frame;
for each of the video frames preceding the reference frame in the first temporal direction, selecting at least a portion of a result from the first tracking result in the first temporal direction as being a portion of the refined tracking result; and
for each of the video frames following the reference frame in the first temporal direction, selecting at least a portion of a result from the second tracking result in the second temporal direction as being a portion of the refined tracking result.

20. The method of claim 8, wherein each tracking result comprises a tracked object outline, and wherein the method further comprises:
for each tracked frame in the second tracking, determining an overlap ratio of tracked object outlines corresponding to the first tracking and the second tracking for the same frame;
stopping tracking of the object in the second temporal direction, wherein stopping is based on the overlap ratio; and
upon stopping tracking in the second temporal direction, selecting a video frame in which stopping occurs as a reference frame;
for each of the video frames following the reference frame in the first temporal direction, selecting at least a portion of a result from the first tracking result in the first temporal direction as being a portion of the refined tracking result; and
for each of the video frames preceding the reference frame in the first temporal direction, selecting at least a portion of a result from the second tracking result in the second temporal direction as being a portion of the refined tracking result.

21. The method of claim 8, wherein generating the refined tracking result further comprises:
for each tracked frame in the second tracking, determining an overlap ratio of tracked object outlines corresponding to the first tracking and the second tracking for the same frame;
selecting a video frame as a reference frame among the video frames, the selected video frame having a largest overlap ratio among the determined overlap ratios;
for each of the video frames preceding the reference frame in the first temporal direction, selecting at least a portion of a result from the first tracking result in the first temporal direction as being a portion of the refined tracking result; and
for each of the video frames following the reference frame in the first temporal direction, selecting at least a portion of a result from the second tracking result in the second temporal direction as being a portion of the refined tracking result.

22. The method of claim 8, wherein generating the refined tracking result further comprises:
for each tracked frame in the second tracking, determining an overlap ratio of tracked object outlines corresponding to the first tracking and the second tracking for the same frame;
selecting a video frame as a reference frame among the video frames, the selected video frame having a largest overlap ratio among the determined overlap ratio;
for each of the video frames following the reference frame in the first temporal direction, selecting at least a portion of a result from the first tracking result in the first temporal direction as being a portion of the refined tracking result; and
for each of the video frames preceding the reference frame in the first temporal direction, selecting at least a portion of a result from the second tracking result in the second temporal direction as being a portion of the refined tracking result.

23. The method of claim 8, wherein generating the refined tracking result comprises selecting at least a portion of a result from the first tracking result in the first temporal direction or at least a portion of a result from the second tracking result in the second temporal direction for each of the video frames as being at least a portion of the refined tracking result.

24. The method of claim 8, wherein the first tracking result in the first temporal direction is based on data indicating an initial outline of the object, wherein the data is obtained from a user.

25. The method of claim 8, wherein the obtained data identifying the outline of the object is obtained from a user.

26. The method of claim 8, wherein the evaluated tracking result is obtained from a user.

* * * * *